(12) United States Patent
Stimpson

(10) Patent No.: US 6,441,324 B1
(45) Date of Patent: Aug. 27, 2002

(54) WEIGHING SYSTEM FOR WEIGHING RAILROAD CARS AND THEIR LOAD

(76) Inventor: Jon L. Stimpson, 690 Discovery Dr., Huntsville, AL (US) 35806

(*) Notice: Subject to any disclaimer, the term of this patent is extended or adjusted under 35 U.S.C. 154(b) by 0 days.

(21) Appl. No.: 09/627,653

(22) Filed: Jul. 28, 2000

(51) Int. Cl.⁷ .............................................. G01G 19/08
(52) U.S. Cl. ................... 177/137; 177/DIG. 9
(58) Field of Search ................... 177/136, 137, 177/138, 139, DIG. 9; 73/862.041, 862.042, 862.043, 862.044, 862.045, 862.046

(56) References Cited

U.S. PATENT DOCUMENTS

| | | | | |
|---|---|---|---|---|
| 3,879,995 A | * | 4/1975 | Libertiny | 73/862.043 |
| 4,248,318 A | * | 2/1981 | O'Neil | 177/137 |
| 4,399,881 A | * | 8/1983 | Theurer et al. | 177/136 |
| 4,673,047 A | * | 6/1987 | Harbour | 177/136 |
| 4,804,053 A | * | 2/1989 | Nordstrom | 177/139 |
| 4,836,034 A | * | 6/1989 | Izumi et al. | 73/862.041 |
| 4,915,183 A | * | 4/1990 | Molenaar et al. | 177/137 |
| 5,544,057 A | * | 8/1996 | Matsuoka | 177/DIG. 9 |

FOREIGN PATENT DOCUMENTS

DE 3512373 * 10/1986 ............ 177/136

* cited by examiner

Primary Examiner—Randy W. Gibson
(74) Attorney, Agent, or Firm—Mark Clodfelter

(57) ABSTRACT

A system for weighing railroad cars and their load is disclosed. In virtually all railroad cars, there exists a disk on a bottom of a railroad car that fits or interfaces with a well in a wheel truck assembly at each end of the railroad car. A load cell is constructed having one surface to bear against the bottom of the disk on the railroad car, and an opposite surface for bearing against a bottom surface of the well in the wheel truck assembly. The output of the load cell is provided to a telemetry transmitter, which transmits an indication of weight to an operator of a crane or other loading appartus loading the railroad car.

20 Claims, 8 Drawing Sheets

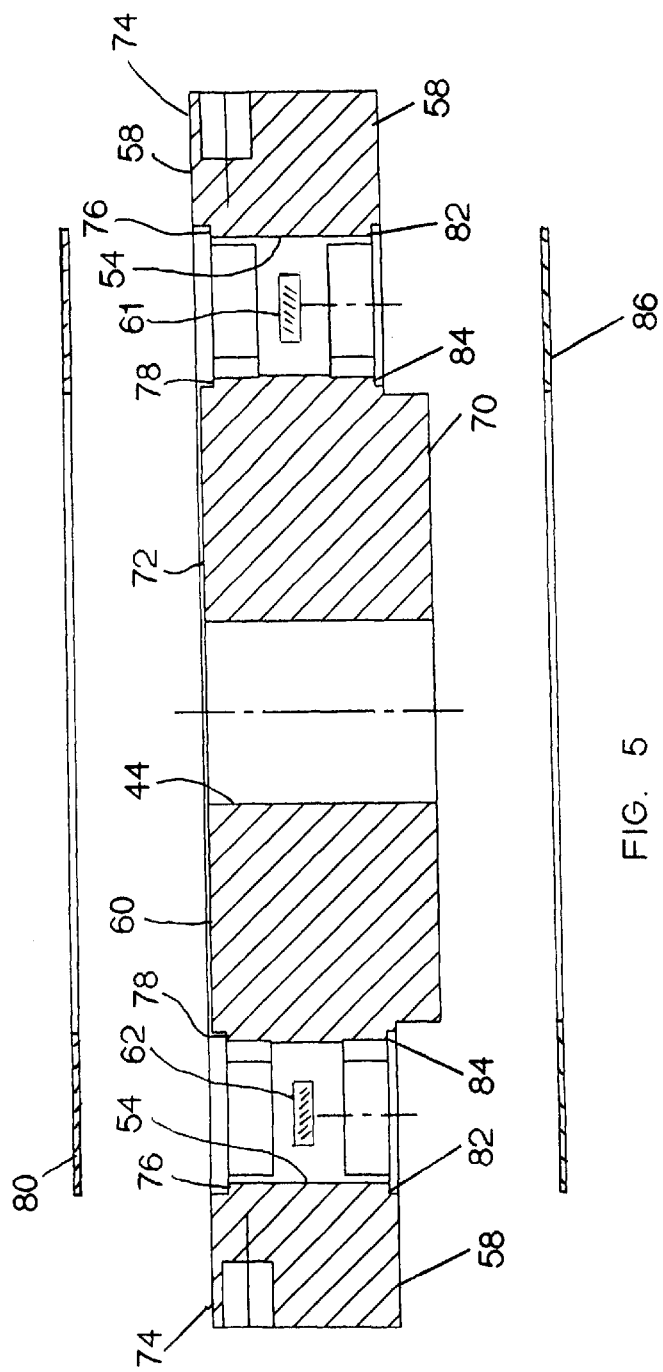
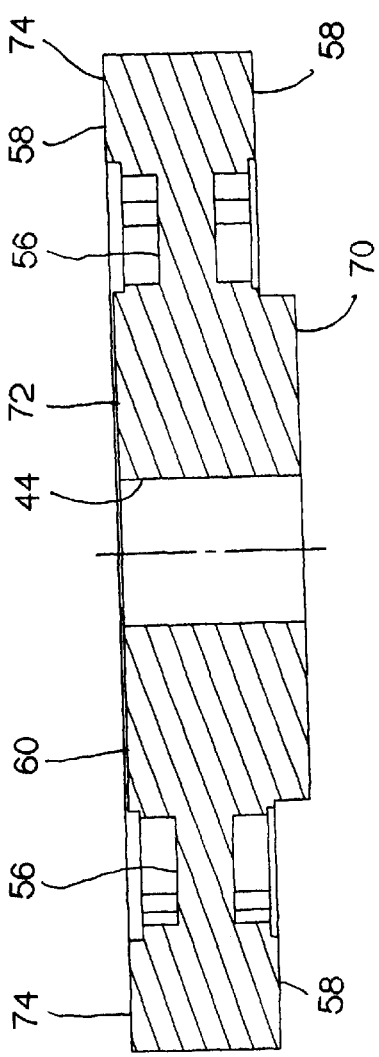
FIG. 5
FIG. 4

WEIGHING SYSTEM FOR WEIGHING RAILROAD CARS AND THEIR LOAD

FIELD OF THE INVENTION

This invention relates to weighing devices for weighing heavy loads, and particularly to a weighing device incorporated in railroad cars and which indicates weight of the car and load.

BACKGROUND OF THE INVENTION

While this invention has many uses in the railroad industries wherein it is desirable to know the weight of a railroad car and a load carried therein, one contemplated use is in the steel industry wherein scrap steel is loaded onto railroad cars and thus transported to a furnace where the steel is melted in large ladles. In some instances, the molten steel is then transferred to railroad cars lined with firebrick so as to prevent rapid cooling of the steel and the loaded car transported to a casting shop or other facility where the molten steel is poured or otherwise worked. In this instance, occasionally the mill or other facility experiences delays from breakdowns or other bottlenecks that prevent the molten steel from being immediately used, which results in the cars filled with molten steel sitting in a railyard sometimes for several days. While the firebrick lining of these cars will prevent rapid heat loss of the molten steel during this time, if the steel becomes too cool it will harden in the car. If this happens, the car and hardened steel therein must be scrapped as there is no practical way to retrieve the steel from the car. This in turn presents a disposal problem. Thus, it would be advantageous to know, in addition to weight of the car and molten steel, location of a particular car and temperature of the molten steel carried thereby.

In other instances, weight of particular types of scrap steel to be melted and which is being loaded onto a railroad car must be known in order that the salvaged steel be of a quality commensurate with its intended use. For instance, if steel is contaminated with too much copper, it cannot be welded. In other instances, proportions of chrome, molybdenum, vanadium and other materials used in alloys of steel must be maintained or adjusted in accordance with a desired product. Where scrap steel is organized in accordance with its type, a particular load of scrap loaded into a railroad car might contain 10,000 pounds of one type scrap steel, 15,000 pounds of a second type of scrap, 20,000 pounds of a third type of scrap, and so forth until the railroad car is loaded with approximately 200,000 to 500.000 pounds of scrap.

To date, the relative quantities of each type of scrap was estimated, resulting in a relatively high rejection rate of the melted steel. Using Applicant's weighing system, this rejection rate has declined by approximately 50% or more.

In addition to the necessity of weighing large amounts of metal, a system for measuring scrap must be extremely durable, as conditions in a scrap yard are harsh. With respect to a railroad car on which scrap is loaded, such loading is done by a crane or large mobile loader similar to a front-end loader or a grapple, with the scrap being sometimes dropped onto the bed of the railroad car. Thus, this application demands extreme durability and ruggedness of design in order to withstand daily pounding of large quantities of scrap steel falling into the railroad cars as described. Further, operation of the weighing device must be jam-free, as any type of jamming of the weighing device would render it inoperable. Here, prior art weighing devices have proved unreliable because they have used platforms in or on the railroad car. Scrap was loaded on these platforms to be weighed, but pieces of scrap and other debris would become lodged under the platform or between the platform and sides of the railroad car. When this happens, the prior art scales become inoperable or unreliable.

In accordance with the foregoing, it is one object of the invention to provide a weighing system for weighing large quantities of scrap metal prior to melting in a foundry or mill. It is another object of the invention to provide a weighing system for weighing an insulated railroad car containing molten metal. It is another object of the invention to provide a weighing system for railroad cars that includes a radio transmitter for transmitting a radio signal to a receiver, the radio signal including indications of weight of the railroad car and a load therein. Two or more receivers may be used to determine location of the railroad car, or the radio signal may contain location information indicative of location of the car. It is yet another object of the invention to provide a weighing system that is easily retrofitted to existing railroad cars, and which is rugged and durable. Other objects of the invention will become apparent upon a reading of the following specification.

SUMMARY OF THE INVENTION

A weighing system for weighing very heavy loads, on the order of 500,000 lbs. or so, is disclosed. In one application for weighing railroad cars, a ring is positioned or mounted to a disk on the underside of the railroad car that interfaces with a well in the wheel truck assembly, with a lower region of the ring extending below a lower surface of the disk. A load cell is mounted or otherwise configured in the lower region of the ring, and in turn extends below a lower edge of the ring. Typically, the disk on the railroad car would fit in the well of the wheel truck assembly, but in this embodiment, the disk of the load cell extending below the ring fits in the well of the wheel truck assembly. The upper surface of the load cell bears against a lower surface of the disk, and the lower surface of the load cell bears against the bottom of the well. Relative displacement between the upper surface and the lower surface of the load cell as a load is applied causes an electrical signal that varies directly with the load to be developed.

BRIEF DESCRIPTION OF THE DRAWINGS

FIG. 4 is a sectional view of the load cell taken along lines 4—4 of FIG. 3.

FIG. 5 is a sectional view of the load cell taken along lines 5—5 of FIG. 3.

DETAILED DESCRIPTION OF THE DRAWINGS

Figure 1:
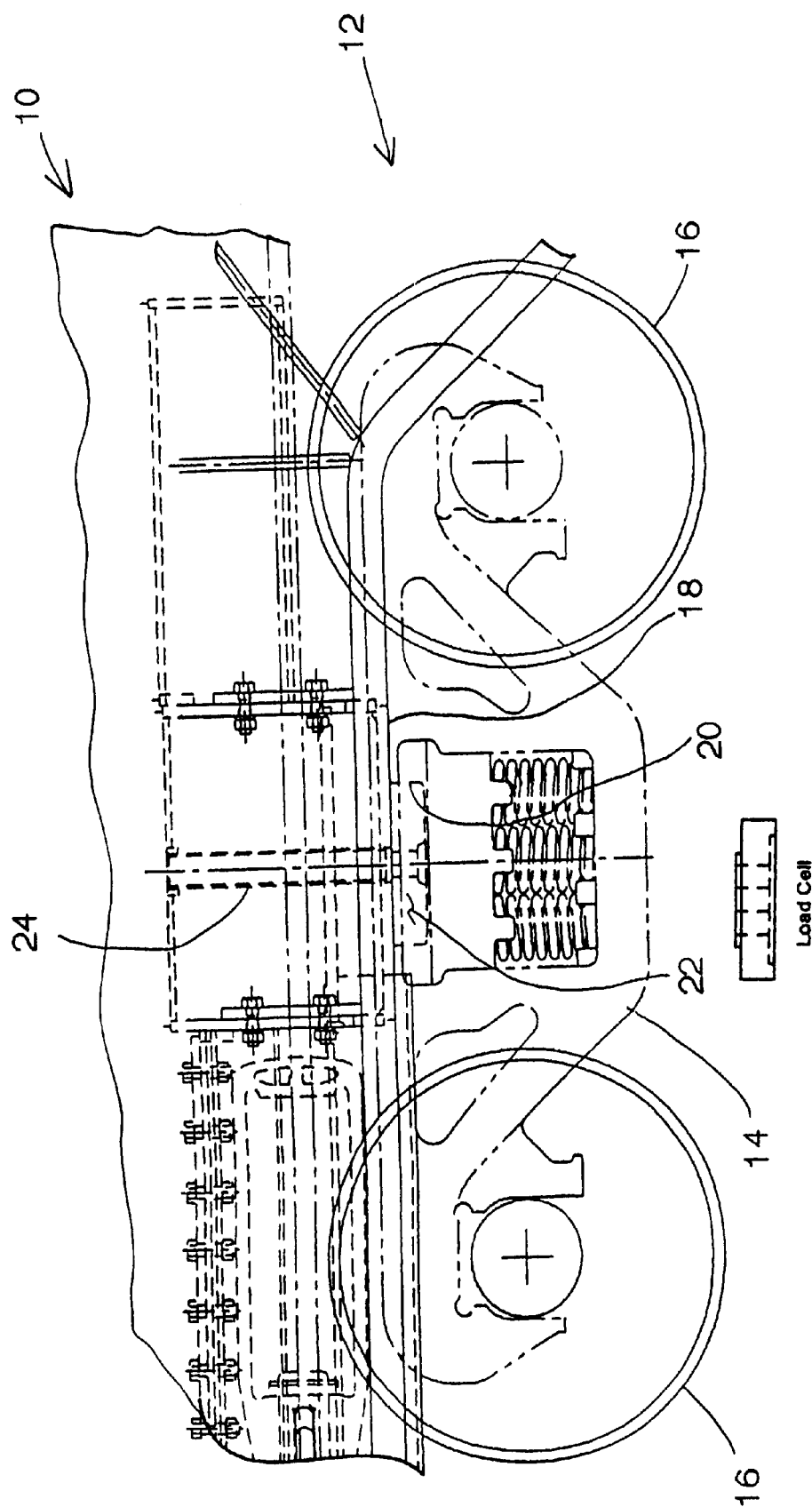
FIG. 1 is a view of a wheel truck assembly for a railroad car with some components shown in dashed lines.

Referring to FIG. 1, a portion of a railroad car 10 and a wheel truck assembly 12 for the railroad car are shown. Truck assembly 12 is provided with a central portion 14 between wheels 16 that bridges the railroad tracks, this central portion 14 in turn provided with an upper area 18 constructed having a circular well 20 (dashed lines). This well 20 is generally centered in portion 14 between the railroad tracks, and receives a downwardly depending disk 22 about 14 inches in diameter and rigidly fixed to structural, load bearing members of railroad car 10. Grease or other lubrication may be applied to the bottom and side walls of well 20. A pin 24 extends upward through a center of a floor of well 20, a center of disk 22 and into the structural member of car 10. With this construction, car 10 is secured to wheel truck assembly 12 while allowing relative pivoting motion between well 20 and disk 22 and about pin 24 to allow the truck assembly to follow curves in the railroad track.

Figure 2:
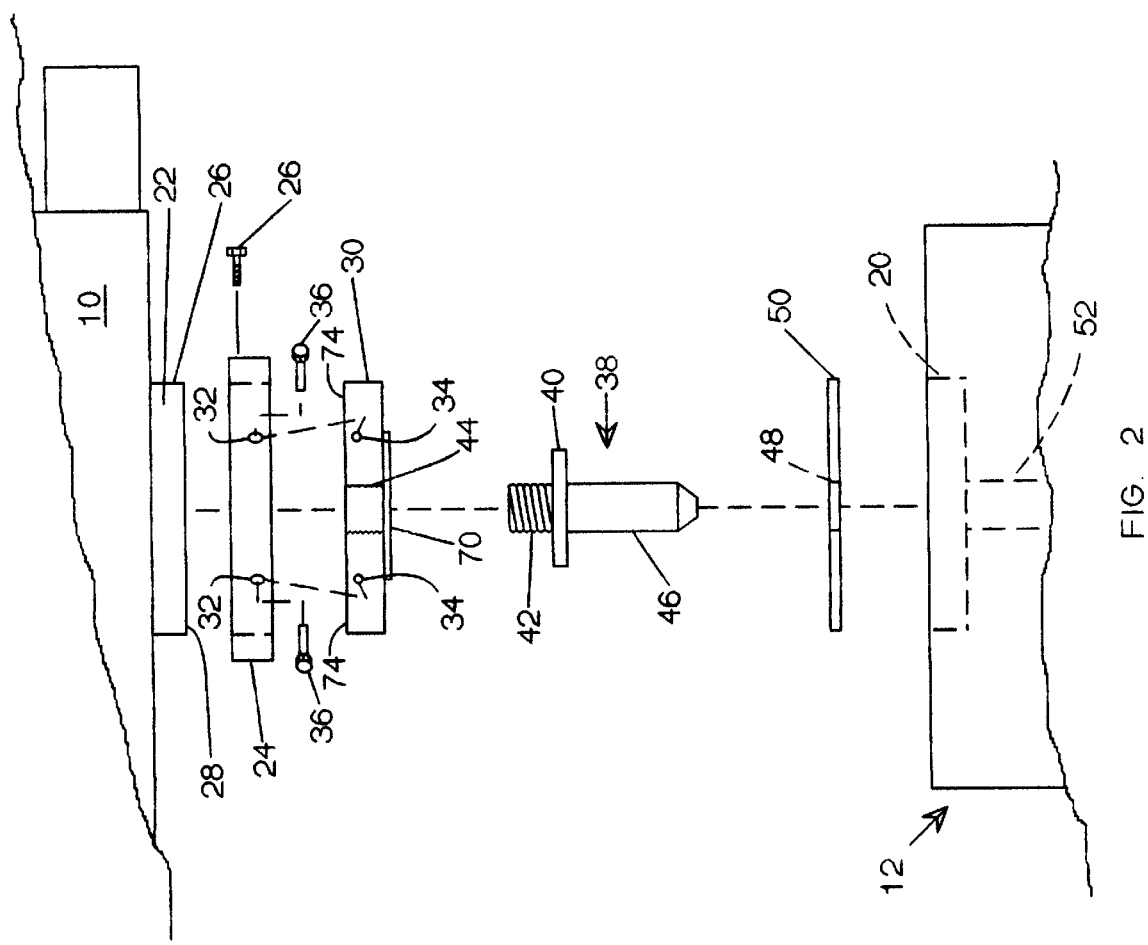
FIG. 2 is an exploded view of a weighing assembly showing how it is fitted between a wheel truck assembly and a railroad car.

Referring now to FIG. 2, an exploded view of the weighing assembly mounted to the railroad car is shown. In this view, a retaining ring 24 is constructed so as to be secured on disk 22, as by bolts or other fasteners 26 threadably engaging ring 24 and clamping against sides 26 of disk 22. Ring 24 is constructed to extend downward, for example an inch or so, below a bottom surface 28 of disk 22.

A load cell 30 of about 14 inches in diameter (described more fully hereinafter) is constructed to fit within the downwardly depending region of 33 ring 24 that extends below bottom 28 of disk 22, with an upper, outer rim of the load cell bearing against bottom 28 of disk 22. A plurality of slots 32 are provided in a lower depending portion of ring 22 and around a periphery thereof, these slots 32 communicating with a like plurality of threaded openings 34 in an upper side of load cell 30. Load cell 30 is loosely secured within ring 24 by bolts 36 loosely extending through slots 32, which bolts 36 being threaded into openings 34 of load cell 30, allowing load cell 30 to freely move vertically within the limits of slots 32 while being restrained from rotational movement by the restraining relationship between sides of the slots and the bolts. Ring 22 also restrains the load cell from lateral movement.

A load pin 38 provided with a flange 40 extending about 0.75 inch outward from pin 38 is threaded on an upper region 42 above flange 40, this threaded upper region 42 threadably engaging a threaded, centrally located opening 44 (dashed lines) in load cell 30 so that a central region of the load cell bears against flange 40 of pin 38. A lower, downwardly depending region 46 of pin 38 extends through an opening 48 in a load plate 50 and an opening 52 centrally located in well 12, with load plate 50 positioned in well 20 of wheel truck assembly 12. A lower surface of flange 40 bears against an upper corresponding surface of load plate 50, with load plate 50 serving to distribute the load of the railroad car and its load within well 20. Pin 38 and load plate 50 are constructed of a tough, durable material, which by way of example may be 17-4 stainless steel hardened to Rockwell 45 or so in order to prevent excessive wear. Relative motion between the wheel truck and railroad car may occur between a lower side of flange 40 and the adjacent upper side of wear plate 50, thus interfaces between these areas may be lubrication points. Such lubrication may be conventionally applied via conventional lubrication equipment and channels in the existing disk 22 and well 20, as should be apparent to one skilled in the art.

While one type of construction of the weighing apparatus is described above, other constructions of the weighing apparatus may be employed. For instance, ring 24 and load cell 30 may be constructed as a single integral unit, with ring 24 fitting around disk 22 and the load cell fitting into well 20. with respect to pin 38, flange 40 may be omitted, with a bottom surface 70 resting directly against plate 50. In some instances, one or the other or both pin 38 and plate 50 may be omitted entirely, as long as a center region of the load cell is constructed so as not to excessively wear the bottom of well 20. In this instance, loads between the wheel truck assembly and railroad car are transmitted through the ring and load cell.

In addition, Applicant's weighing system is easily retrofitted to existing railroad cars. For such a retrofit, the pin between the railroad car and wheel truck assembly is disengaged, and the car lifted from the wheel truck assembly. A ring 24 and load cell may then be attached to disk 22, with the load cell having a substitute pin 38 threaded therein. A load plate 50 is placed in well 20, and wiring routed from the load cell to connection circuitry located in a protected location on the railroad car. The car is then lowered back down onto the wheel truck assembly with pin 38 engaging the opening 52, with load cell 30 generally resting in well 20 and within the portion of ring 24 that extends below surface 28 of disk 22.

With the above-described construction, as the car is loaded with scrap metal or molten metal, the outer rim of load cell 30 bearing against disk 22 is displaced downward slightly, perhaps 0.010 or so under a full load, which may be as high as 200,000 pounds or so, causing the load cell to develop an electrical output indicative of weight.

Figure 3:
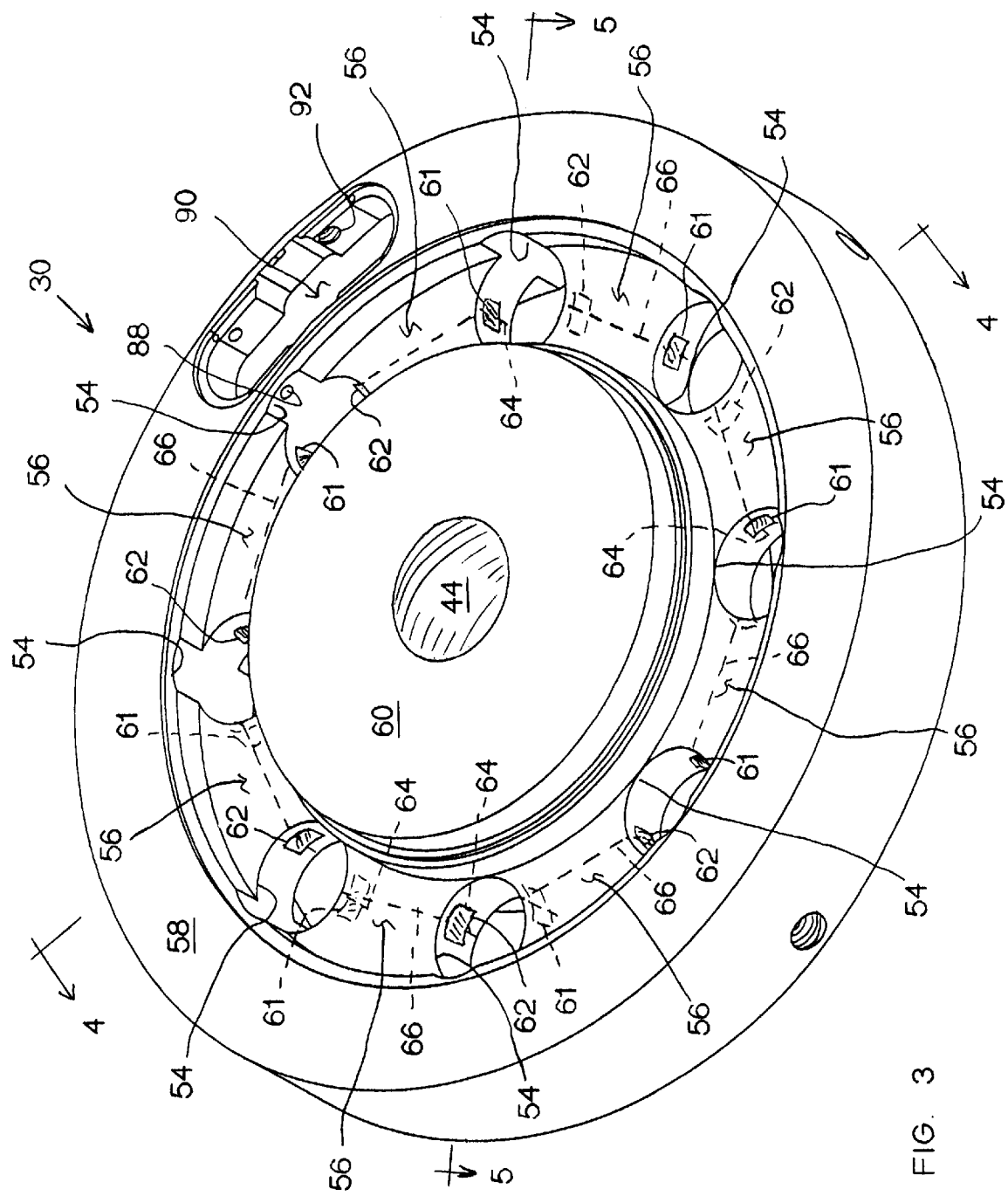
FIG. 3 is a perspective view of a load cell of the instant invention.

Referring to FIG. 3, a top 3-dimensional view of load cell 30 is shown. In this view, it is seen that 8 openings 54 of about 1.562 inches are provided between the center region that bears against flange 40 and the outer region that bears against disk 28. While 8 openings 54 are shown, other embodiments may have from about 4 to 10 or so openings, depending on the capacity of the load cell. Additionally, while the openings shown are circular, square or rectangular openings with rounded corners may be employed. Openings 54 are equally spaced about the center region, with webs 56 of about 1.882 inches separating openings 54. Rim 58, which bears against disk 22, is about 2.1 inches in thickness and extends as shown peripherally around load cell 30. Center load area 60 is about 7 inches in diameter, and as stated bears on a bottom side against flange 40 of pin 38, thus supporting the railroad car and load therein to be weighed. As stated, center load area 60 is further provided with a threaded central opening 44 for threadably receiving pin 38 (FIG. 2).

Figure 6:
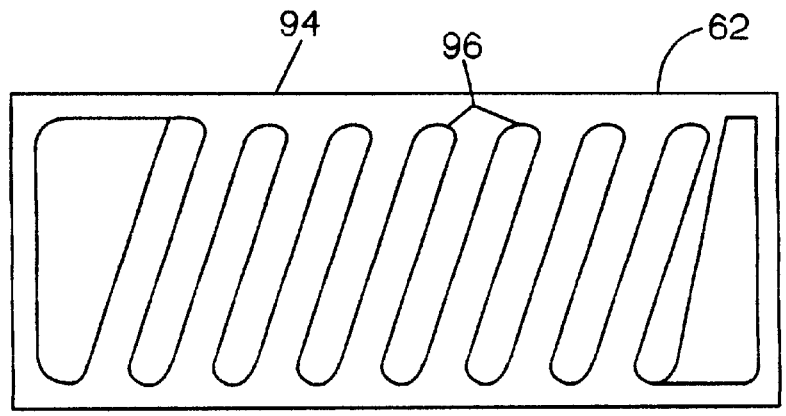
FIGS. 6 is an enlarged front view of a strain gage used in the present invention.
Figure 7:
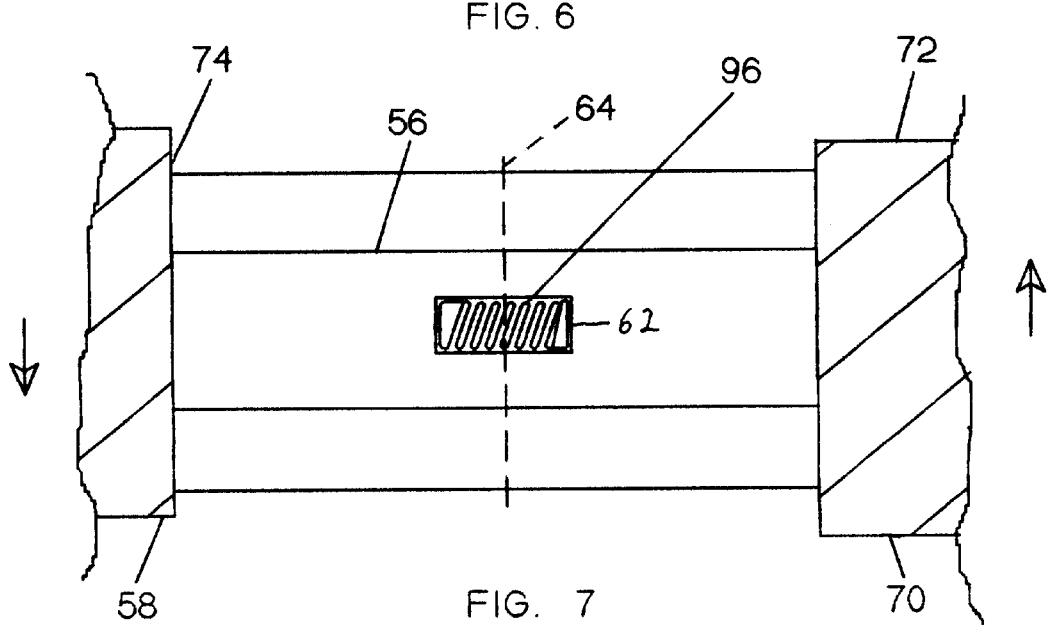
FIG. 7 is a view of a bore of the load cell containing a strain gage wherein slanted leads of the strain gage are put under tension when the load cell is loaded.
Figure 8:
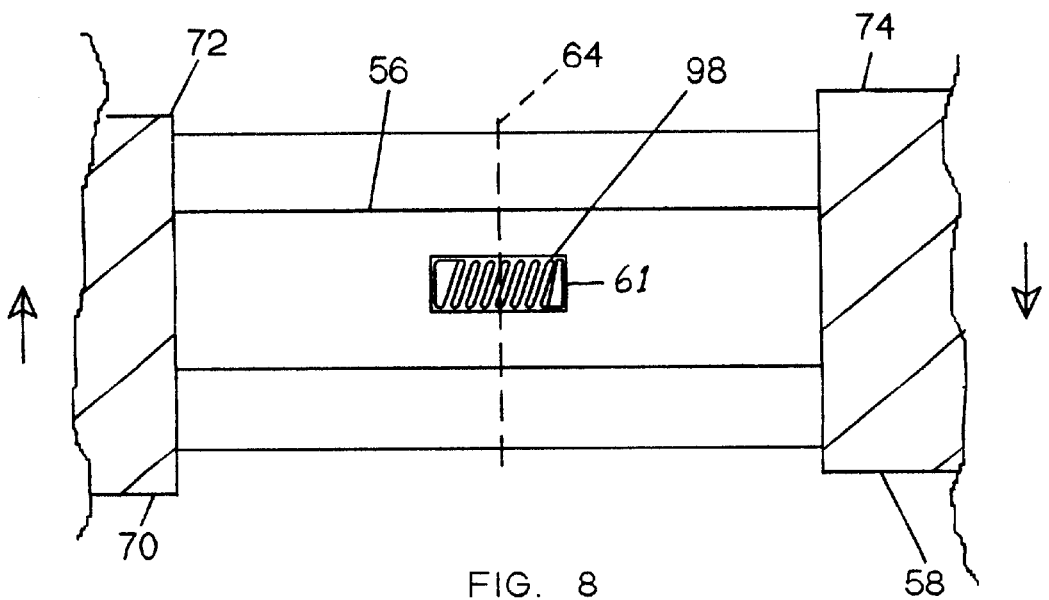
FIG. 8 is a view of a bore of the load cell containing a strain gage wherein slanted leads of the strain gage are compressed when the strain gage is loaded.

In order to develop an electrical signal indicative of weight of the railroad car and its load, a pair of strain gages 61, 62 are rigidly mounted, as by a bonding agent, to a side wall of each of openings 54. These strain gages are commercially available from sources such as TRANSCELL, of Chicago, Ill. Here, and referring to FIGS. 3 and 6, it is seen that the same type strain gage is used on opposite sides of each of openings 54. As shown in FIG. 6, these strain gages are constructed on a thin, flexible insulative substrate 94 as a continuous, looped run of material similar to the conductive metal on a circuit board, with the looped runs being inclined to the right. As shown in FIGS. 3, 7 and 8, strain gages designated 61 are mounted to sides of bores 54 such that they face in a clockwise direction around load cell 30, while strain gages designated 62 are mounted in bores 54 so that they face counterclockwise around load cell 30. With this mounting, as the web is deformed under a load (indicated by arrows in FIGS. 7 and 8), the slanted runs 96 of strain gages 62 will be slightly stretched, lengthening these runs and causing a corresponding slight increase of impedance, while the slanted runs 96 of strain gages 61 will become slightly compressed, causing a corresponding decrease in impedance. Significantly, these strain gages are each mounted centered on a vertical line 64 (dashed lines in FIGS. 3, 7 and 8) parallel to the axis of each bore and perpendicular to a line 66 (dashed lines in FIG. 3) defining a shortest distance between two adjacent openings 54. This line 64 generally defines a vertical region of the webs 56 about which maximum flexure of the webs in opposite directions under load occurs. While a pair of strain gages are shown for each of openings 54, in another embodiment only one strain gage may be provided for each opening, with the single gage in each opening alternating in the direction it faces between adjacent openings.

As shown in FIGS. 3, 4, 5, 7 and 8, web portions 56 between openings 54 are of a reduced thickness as compared to rim portion 58 and central region 60. This reduced thickness is selected to allow about 0.010 inch displacement between center load area 60 and rim 58 with the load cell under a full load of about 200,000 pounds or so. By way of example, with the load cell constructed of 17-4 stainless steel hardened to about Rockwell 45 or so, the thickness of webs 56 between openings 54 is about 0.800 inch or so. Further, the distance between openings 54 also is relatively critical in selecting degree of flexure of webs 56; in the above example such distance may be about 1.882 inches as described. As shown in FIGS. 4 and 5, a bottom surface 70 (that bears against flange 40 of pin 38) of center load area 60 extends below a lower surface of rim 58. Conversely, a top surface 72 of center load area 60 is recessed by about 0.020 inches or so with respect to an upper surface 74 of rim 58, this upper surface 74 of rim 58 bearing against disk 22 of the railroad car (FIG. 2). With this construction, the maximum displacement of rim 58 with respect to center load area 60 is defined by the difference between upper surface 74 of rim 58 and the top surface 72 of the center load area, which as stated is about 0.020 or so. While the thickness of webs 56 is selected such that under a full load the maximum anticipated deflection is about 0.010 or so, the extra clearance of 0.010 provides an overload capacity while preventing the load cell from being damaged in the event of severe overloading or from shock of heavy loads being dropped into the railroad car. In one or more different embodiments, the top and bottom surfaces of the rim and center region of the load cell may be constructed with no difference in elevation, and a first shim located on upper surface 74 of rim 58 and a second shim located below center load area 60. Here, thickness of the shims may be varied to set maximum weight limits and safety factors.

Referring to FIG. 5, a lip 76 may be provided adjacent rim 58 on an upper side of load cell 30, and a corresponding lip 78 may be provided adjacent load area 60 also on an upper side of load cell 30. These lips 76, 78 together form a recess within which a thin, flexible ring 80 may be mounted, as by welding, bonding or configuring ring 80 to be an interference fit within lips 76, 78. Similar lips 82, 84 are provided on a bottom side of load cell 30 and serve to receive a thin, flexible ring 86, which also may be mounted as described. Rings 80 and 86 enclose the area of load cell 30 containing openings 54, webs 56 and strain gages 62 along with their associated wiring (not shown), thereby protecting this enclosed area from debris, damage and moisture.

Wiring from each strain gage is routed around central area 60 and through an opening 88 (FIG. 3) which communicates with a pocket 90 cut in rim 58, pocket 90 serving to receive a circuit board for enabling connection of the strain gages in a bridge configuration and for supporting calibration and compensation resistors. A threaded opening 92 receives an electrical coupling on an exterior side of load cell 30 in order to provide an electrical connection to components including a telemetry transmitter (not shown), these components conventionally mounted to the railroad car in a relatively protected location.

Figure 9:
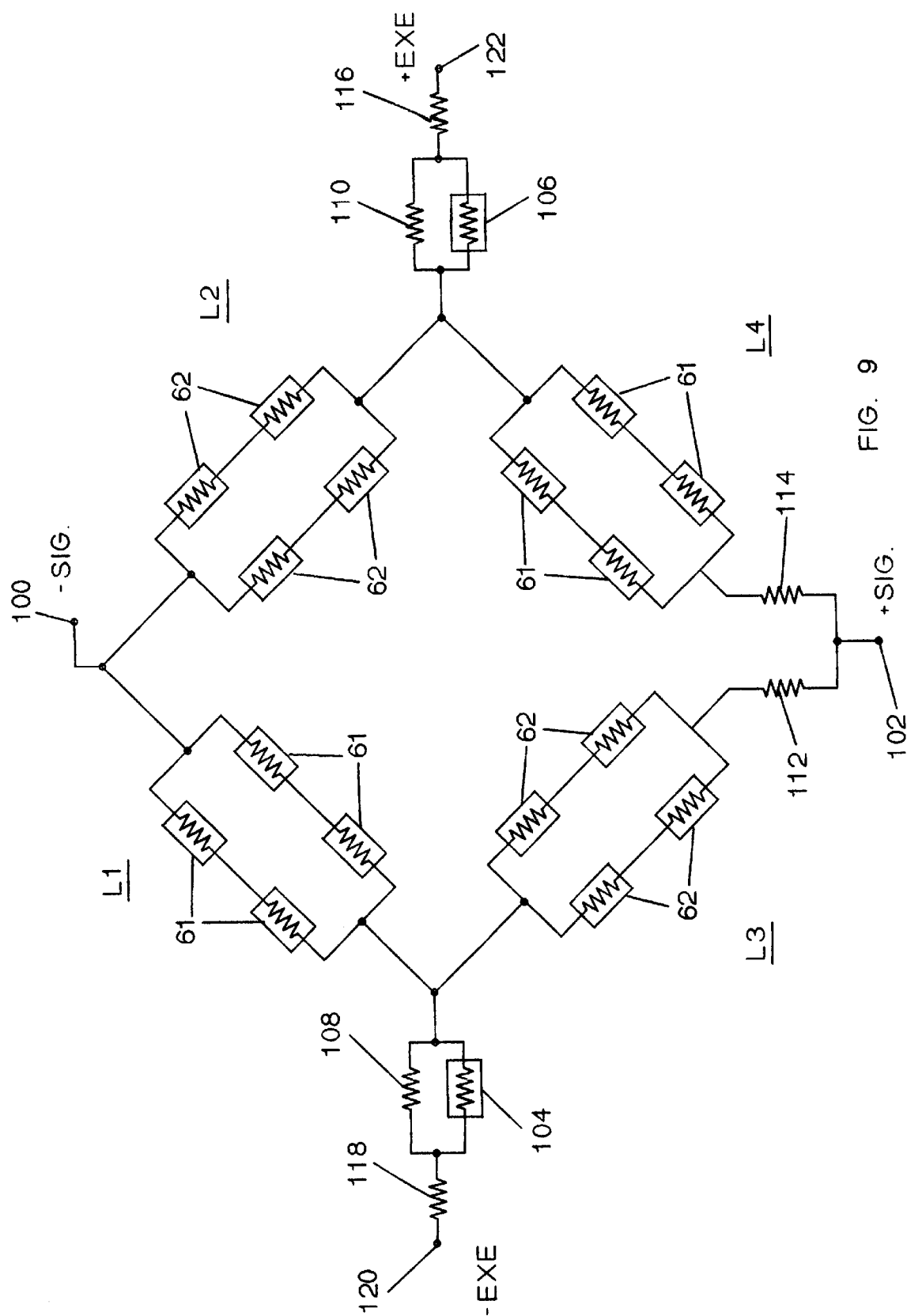
FIG. 9 is an electrical schematic of the load cell.

Referring now to FIG. 9, an electrical schematic of wiring of the strain gages and associated components is shown. Here, it is seen that the 16 strain gages of the load cell are wired together in a bridge configuration wherein each leg of the bridge is formed by four of either gages 61, 62. As shown, two of the strain gages of each leg are coupled in series to form a series pair, with two series pairs coupled in parallel to form the leg of the bridge. With this configuration, minor variations of resistance in each strain gage are minimized.

In order to compensate for changes in elasticity of the material the load cell is constructed of with changes of temperature, modulus resistors 104 and 106 are provided in parallel with shunt resistors 108 and 110, respectively, these modulus resistors serving to assist in maintaining a close linear output of the bridge circuit by altering their resistance directly with temperature of the load cell. Thus, these modulus resistors reduce an output signal of the load cell in an inverse relationship with temperature. Here, as temperature increases, webs 56 flex more with increasing temperature, causing the bridge circuit to develop a higher output for the same load at a cooler temperature. In order to compensate for this temperature-related nonlinear influence, impedance of the modulus resistors increases proportionally with temperature, with the degree of increase of impedance of the modulus resistors selected to match the increase of elasticity of the load cell. Such increase in impedance of the modulus resistors reduces output of the bridge circuit.

Another temperature compensating resistor 112 is provided in parallel a with a balance resistor 114, this temperature compensating resistor selected to vary inversely with temperature. In this application, as temperature of the load cell increases, impedance of electrical components of the bridge circuit increases, causing output therefrom to become reduced with increasing temperature. In order to compensate for this temperature related nonlinearity, temperature compensating resistor 112 is selected so that its impedance decreases with temperature so as to closely counteract the increase in impedance of the other electrical components of the bridge.

For a final calibration, a balance resistor 114 is provided in a divider circuit with temperature compensating resistor 112, and calibration resistors 116 and 118 are connected in series with modulus resistors and shunt resistors 104, 108 and 106, 110, respectively. Here, a constant excitation voltage, such as a voltage between 10–15 volts, is applied between terminals 120 and 122 and the voltage at terminals 100 and 102 observed while temperature of the load cell is varied. If the output across terminals 100 and 102 increases with temperature then temperature compensation resistor 112 is connected to the L3 side of the bridge as shown. Conversely, if the output at terminals 100 and 102 decreases with an increase in temperature then temperature compensating resistor 112 is connected to the L4 side of the bridge circuit. A value of balance resistor 114 is selected so as to balance the output of the bridge circuit to a null output with no load on the load cell, and the balance resistor coupled in the divider circuit. Values of calibration resistors 116 and 118 are selected so as to provide an output of about 30 millivolts with the load cell fully loaded to about 200,000 lbs. at an excitation voltage of 10 volts.

Utilizing the wiring configuration as described, and with no unbalance in the bridge, corresponding to an unloaded state of the load cell, current flow through legs L1 and L2 is exactly the same as current flow through legs L3 and L4, resulting in no signal output at terminals 100, 102. When the load cell is loaded, strain gages 61 are lowered in impedance while strain gages 62 are increased in impedance, providing an analog signal output between terminals 100 and 102 which varies directly with the load.

Figure 10:
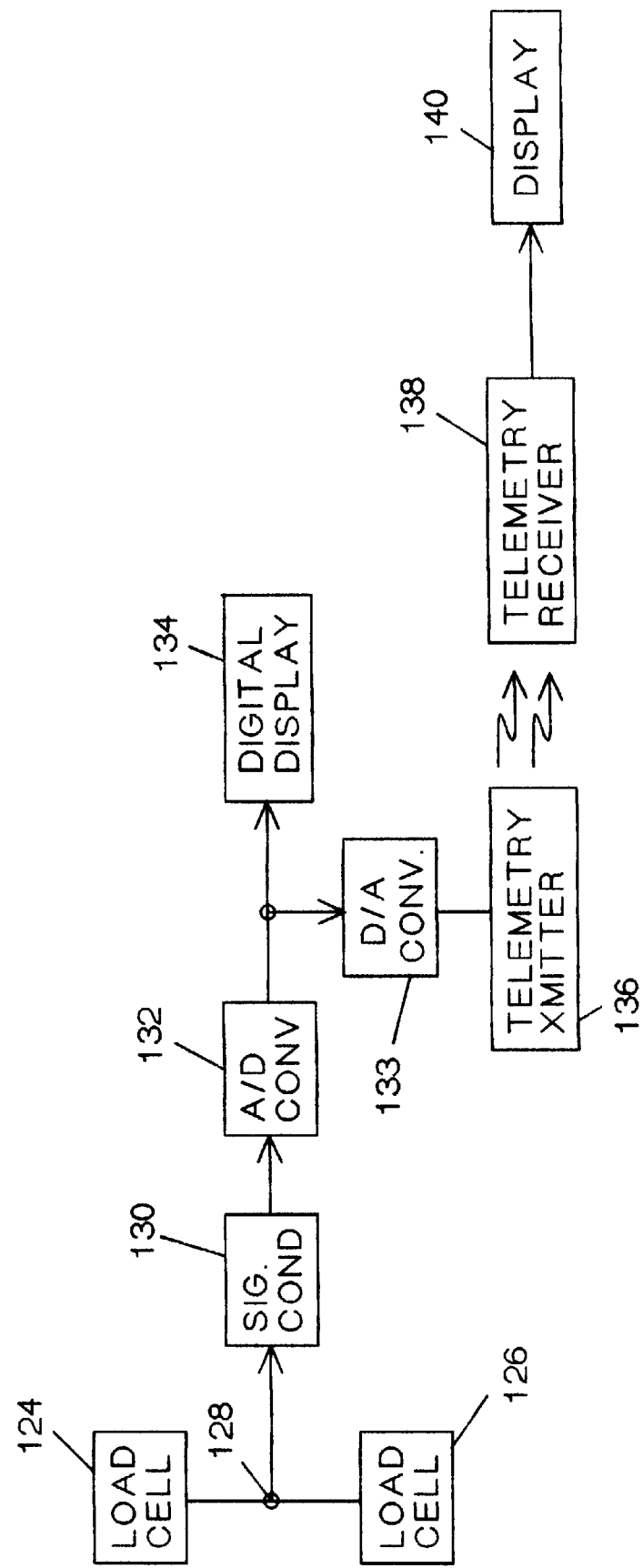
FIG. 10 is a block diagram of components of a weight and telemetry system of the instant invention.

In use, and as shown in FIG. 10, a load cell 124 is installed as described at the front wheel truck assembly of a railroad car and a second load cell 126 installed at the rear wheel truck assembly of the railroad car. The outputs of the two load cells are summed at summing junction 128, and the summed signal applied to a signal conditioner 130. Conditioner 130 amplifies the summed signal from the load cells and generally filters the signal, removing high frequency noise, EMF interference, radio interference and the like, as should be apparent to one skilled in the art. Thus, with an equally distributed load on the railroad car, as when loaded with molten steel, each load call will provide approximately the same signal output which when summed indicates weight of the car and molten steel. Where the load is not equally distributed, as where the railroad car is filled or partially filled with scrap, then the two outputs are not the same, but when summed are still indicative of total weight of the railroad car and the load thereon. In some instances where very heavy loads are to be moved, a pair of wheel truck assemblies may be used at each end of the railroad car, with a load cell installed in each truck assembly, with the output of each load cell applied to a summing junction common to all the load cells. After being conditioned, the signal is applied to an analog-to-digital converter 132, which converts the summed analog output to a digital signal of sufficient resolution to indicate a weight down to 500 lbs. or so. This digital signal is then applied to a digital indicator 134. The signal conditioner 130, converter 132 and indicator 134 may be mounted directly to the railroad car in a relatively protected location, and used for calibration purposes. After analog-to-digital converter 132 a digital-to-analog converter 133 may be used in order to provide a current signal indicative of weight, which may be 20 milliamps or so for a fully loaded railroad car. This analog signal is converted to telemetry and transmitted as radio telemetry by a transmitter 136. The radio signal is received by a telemetry receiver 138, which may be located in the operator's cabin of a crane where it provides the telemetry signal to an indicator 140. Indicator 140 in turn provides the signal as a weight indication to the crane operator, who may then adjust proportions of scrap metal or loading of the railroad car as desired. Electrical power for circuitry aboard the railroad car may be provided from a battery source or from an electrical connection to a locomotive. It is to be understood that the components of FIG. 10 may typically be controlled by a microprocessor, as should be apparent to one skilled in the art.

Figure 11:
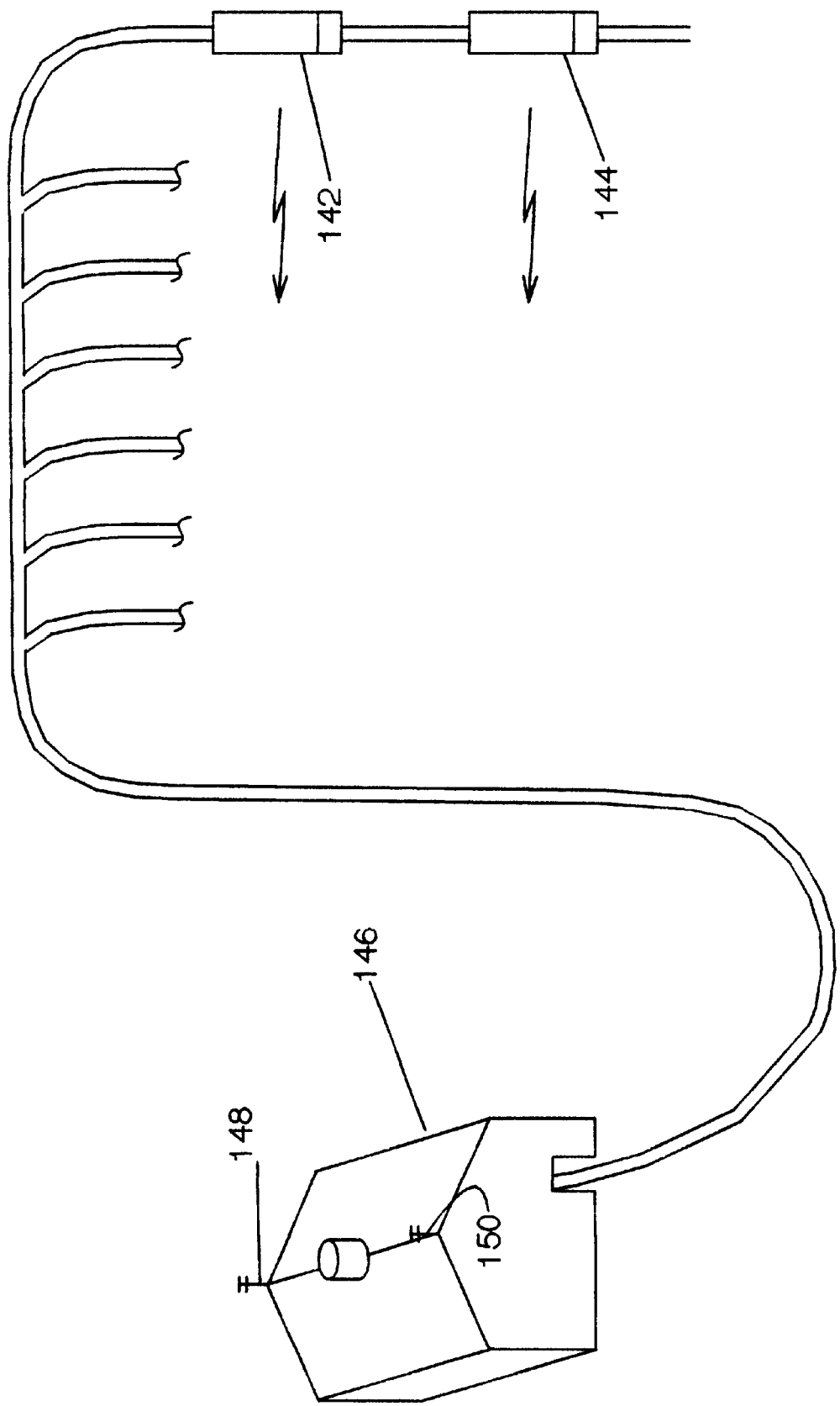
FIG. 11 is a diagrammatic illustration of a mill and millyard showing particulars of use of the present invention.

FIG. 11 shows a diagrammatic illustration of a mill or the like where railroad cars 142 and 144 are conventionally fitted with temperature sensors (not shown) for indicating temperature of molten steel. The temperature sensors may be coupled to the telemetry transmitter as described so as to transmit temperature data in addition to weight of the car and load to mill 146. This would allow a mill operator to determine which railroad cars have the coolest molten steel therein so these cars may be emptied first. In addition, location of a particular railroad car in a railroad yard may be ascertained by using a pair of antennae 148, 150 in conjunction with triangulation techniques performed by a computer. Location may also be determined by a GPS receiver located on each car, with the GPS receiver providing an output suitable to be transmitted by telemetry to the mill. In this instance, the GPS receiver would need to be ruggedized in order to withstand the harsh conditions of a railroad yard. Further, in order to determine which signal is being sent from which railroad car, the telemetry transmitter may be sequentially polled, or each telemetry transmitter may be configured to provide a unique identification code identifying that particular transmitter to the receiver in the mill.

Having thus described my invention and the manner of its use, it should be apparent that incidental changes may be made thereto that fairly fall within the following appended claims, wherein I claim:

1. A weighing system for a railroad car comprising;
   a railroad car further comprising;
   at least a first wheel truck assembly located at one end of said railroad car and a second wheel truck assembly located at an opposite end of said railroad car,
   an interface between said railroad car and each said wheel truck assembly, said interface comprising at least a disk having a bottom surface, the disk mounted to said railroad car and a well in each said wheel truck assembly for receiving said disk, and for each said interface, said weighing system comprising;
   a ring fitted about a periphery of said disk,
   a load cell in a lower region of said ring, with an upper surface of said load cell bearing against said bottom surface of said disk, said load cell extending below said lower region of said ring so that said load cell rotatably fits in said well, with a lower surface of said load cell bearing against a bottom of said well,
   whereby as said railroad car is loaded, said upper surface of said load cell and said lower surface of said load cell are displaced with respect to each other, developing an electrical output representative of weight.

2. A weighing system as set forth in claim 1 wherein said upper surface of said load cell that bears against said bottom surface of said disk is along an upper rim of said load cell and said lower surface of said load cell that bears against said bottom of said well is a center region of said load cell.

3. A weighing system as set forth in claim 1 wherein said load cell is a separate component from said ring, and said load cell is mounted in said ring so as to allow vertical movement of said load cell with respect to said ring while said load cell is restrained from rotational and lateral movement within said ring.

4. A weighing system as set forth in claim 1 further comprising a pin extending through a center regio[008e] of said well, said pin having a threaded region on an upper end thereof, and a mating threaded opening in a central region of said load cell for receiving said threaded region of said pin, said pin further including a flange that bears against said lower surface of said load cell.

5. A weighing system as set forth in claim 4 further comprising a hardened wear and load distribution plate fitted within said well, with a lower surface of said flange bearing against said wear and load distribution plate.

6. A weighing system as set forth in claim 1 wherein displacement between said upper surface and said lower surface is limited to prevent damage to said load cell.

7. A weighing system as set forth in claim 1 wherein said load cell is provided with a plurality of openings between said upper surface and said lower surface, with web regions between said openings, and at least one strain gage mounted to at least one said web region of each said opening so as to provide an electrical signal that varies directly with flexure of said web region.

8. A weighing system as set forth in claim 7 further comprising a pair of said strain gages mounted in each said opening, each said strain gage of said pair of strain gages in each said opening mounted to respective said web regions of a respective said opening, each said strain gage further centered on a line defining a closest point between said openings so that impedance of one strain gage of said pair of strain gages increases and impedance of the other strain gage of said pair of strain gages decreases with load applied to the load cell.

9. A weighing system as set forth in claim 8 wherein said strain gages are coupled in a bridge circuit having four legs, with four strain gages in each said leg of said bridge circuit.

10. A weighing circuit as set forth in claim 9 wherein each said leg comprises two strain gages coupled in series to form a series pair, with two of said series pairs coupled in parallel to form said leg of said bridge circuit.

11. A weighing system as set forth in claim 9 wherein output signals from a first load cell at one end of said railroad car and output signals from a second load cell at an opposite end of said railroad car are summed to provide a summed signal indicative of weight of said railroad car and load therein, and a radio transmitter that receives said summed signal and transmits a radio signal containing said summed signal to a remote location.

12. A weighing system for measuring weight of a railroad car and a load therein with a relatively high degree of accuracy, said railroad car having a disk mounted to a load-bearing region of a bottom of each end of the railroad car and a wheel truck assembly positioned at each said end of the railroad car, each said wheel truck assembly provided with a centrally located recess in an upper surface thereof for rotatably receiving a respective said disk, said weighing system comprising;
  a combined weight scale and load interface positioned between said disk on said railroad car and said recess in said wheel truck assembly, said weight scale and load interface comprising:
    a mounting ring for each said disk, said mounting ring fixedly mounted about a periphery of said disk so that a lower edge of said mounting ring extends below said disk,
    a load cell generally fixed within each said mounting ring, said load cell having an upper annular surface adjacent to a peripheral region constructed to closely fit within said ring, with said upper annular surface adapted to bear against a lower surface of said disk and against sides of said recess, laterally and rotatably connecting said railroad car and said wheel truck assembly, said load cell further having a lower central region fitted in a respective said recess so that shear displacement between said peripheral region and said central region is sensed and an electrical signal provided that is indicative of weight applied to that said load cell,
    a load bearing portion in coaxial relation with said central region, and fitted in said recess for distributing coaxial loads from said central region into said recess.

13. A weighing system as set forth in claim 12 wherein said load bearing portion further comprises a pin engaging a coaxial opening in said central region of said load cell, and extending at an opposite end into an opening coaxially located in said well.

14. A weighing system as set forth in claim 13 further comprising a hardened, weight distributing plate on a floor of said well and a flange fixed to said pin, said flange bearing between said central region of said load cell and said weight distributing plate.

15. A weighing system as set forth in claim 14 wherein said electrical signal from each said load cell is summed in order to develop a composite electrical signal indicative of total weight of said railroad car and its load.

16. A weighing system as set forth in claim 12 wherein said shear displacement occurs in a plurality of thick webs between said peripheral region and said central region, said plurality of thick webs permitting a displacement of about 0.010 inches between said peripheral region and said central region under a load of about 200,000 pounds.

17. A weighing system as set forth in claim 15 wherein said composite electrical signal is provided to a radio transmitter for wirelessly transmitting said composite electrical signal to a receiver at a remote location.

18. A method for fitting a railroad car and each wheel truck assembly associated therewith with weight sensing and load-transmitting apparatus for indicating weight of the railroad car and load therein while securely interfacing each said wheel truck assembly to said railroad car, said weight sensing and load-transmitting apparatus indicating weight to a resolution of about 500 pounds or so, and said railroad car having a load-transmitting disk at each end thereof for each said wheel truck assembly and a well in each said wheel truck assembly into which said disk is rotatably fitted, said method comprising the steps of:
  positioning a first load bearing member to bear on a lower surface of said disk and against side surfaces of said well,
  laterally restraining said first load bearing member with respect to said disk,
  positioning a second load bearing member to bear on a bottom surface of said well, said first load bearing member and said second load bearing member connected so that weight applied to said first load bearing member and said second load bearing member causes deflection, in direct relation with said weight, to occur between said first load bearing member and said second load bearing member,
  developing an electrical signal from said deflection indicative of said weight,
  summing said electrical signal from each said weight-sensing and load transmitting apparatus to develop a weight signal indicative of total weight of said railroad car and its load.

19. A method as set forth in claim 18 further comprising the step of positioning one end of a pin coaxially in said second member, and placing an opposite end of said pin in an opening coaxially located in said well.

20. A method as set forth in claim 19 further comprising the step of constructing a flange on said pin, and positioning a load plate on a floor of said well, said flange bearing between said load plate and said second member.

* * * * *